United States Patent [19]

Peiffer et al.

[11] Patent Number: 5,756,169

[45] Date of Patent: May 26, 1998

[54] BIAXIALLY ORIENTED POLYOLEFIN FILM, PROCESS FOR ITS PREPARATION AND ITS USE

[75] Inventors: Herbert Peiffer, Mainz; Gunter Schloegl, Kelkheim, both of Germany

[73] Assignee: Hoechst AG, Germany

[21] Appl. No.: 328,861

[22] Filed: Oct. 25, 1994

[30] Foreign Application Priority Data

Oct. 27, 1993 [DE] Germany .................. 43 36 560.4

[51] Int. Cl.$^6$ ............... B32B 27/08; B32B 27/16; B32B 27/20; B32B 27/32

[52] U.S. Cl. ............ 428/34.9; 428/35.1; 428/35.7; 428/36.92; 428/331; 428/515; 428/516; 428/523; 428/910; 264/345

[58] Field of Search ............... 428/34.9, 36.9, 428/36.91, 328, 331, 332, 349, 448, 483, 475.2, 476.9, 477.9, 910, 516, 35.1, 515, 523, 35.7, 36.92; 264/280, 288.4, 290.2, 289.6, 345

[56] References Cited

U.S. PATENT DOCUMENTS

| | | | |
|---|---|---|---|
| 4,311,660 | 1/1982 | Barham et al. | 264/342 RE |
| 4,415,523 | 11/1983 | Barham et al. | 264/342 R |
| 5,152,946 | 10/1992 | Gillette | 264/230 |
| 5,158,637 | 10/1992 | Takashige et al. | 156/244.11 |
| 5,364,704 | 11/1994 | Murschall et al. | 428/516 |
| 5,411,695 | 5/1995 | Yamada et al. | 264/211.13 |

FOREIGN PATENT DOCUMENTS

| | | |
|---|---|---|
| 0 423 630 | 4/1991 | European Pat. Off. . |
| 41 41 989 | 6/1993 | Germany . |
| 58-160122 | 9/1983 | Japan . |
| 5154905 | 6/1993 | Japan . |

OTHER PUBLICATIONS

Database WPI, Derwent Publications Ltd., London, GB; AN 93-231949.

*An Attempt to Simulate the Bowing Phenomenon in Tenter with Simple Models*, Toshiro Yamada and Chisato Nonomura, Toyobo Co., Ltd., Toyobo Research Institute, pp. 1399–1408 Jul. 1993.

Primary Examiner—Vivian Chen
Attorney, Agent, or Firm—Connolly & Hutz

[57] ABSTRACT

A bowing value, expressed in terms of the curvature, of less than 10 mm is obtained by an additional heat treatment step at temperatures greater than 40° C. to 80° C. after the transverse stretching, the heat-setting and the cooling of the film. The polyolefin film contains a propylene polymer with at least 90% by weight of polypropylene or contains a polypropylene blend.

11 Claims, 4 Drawing Sheets

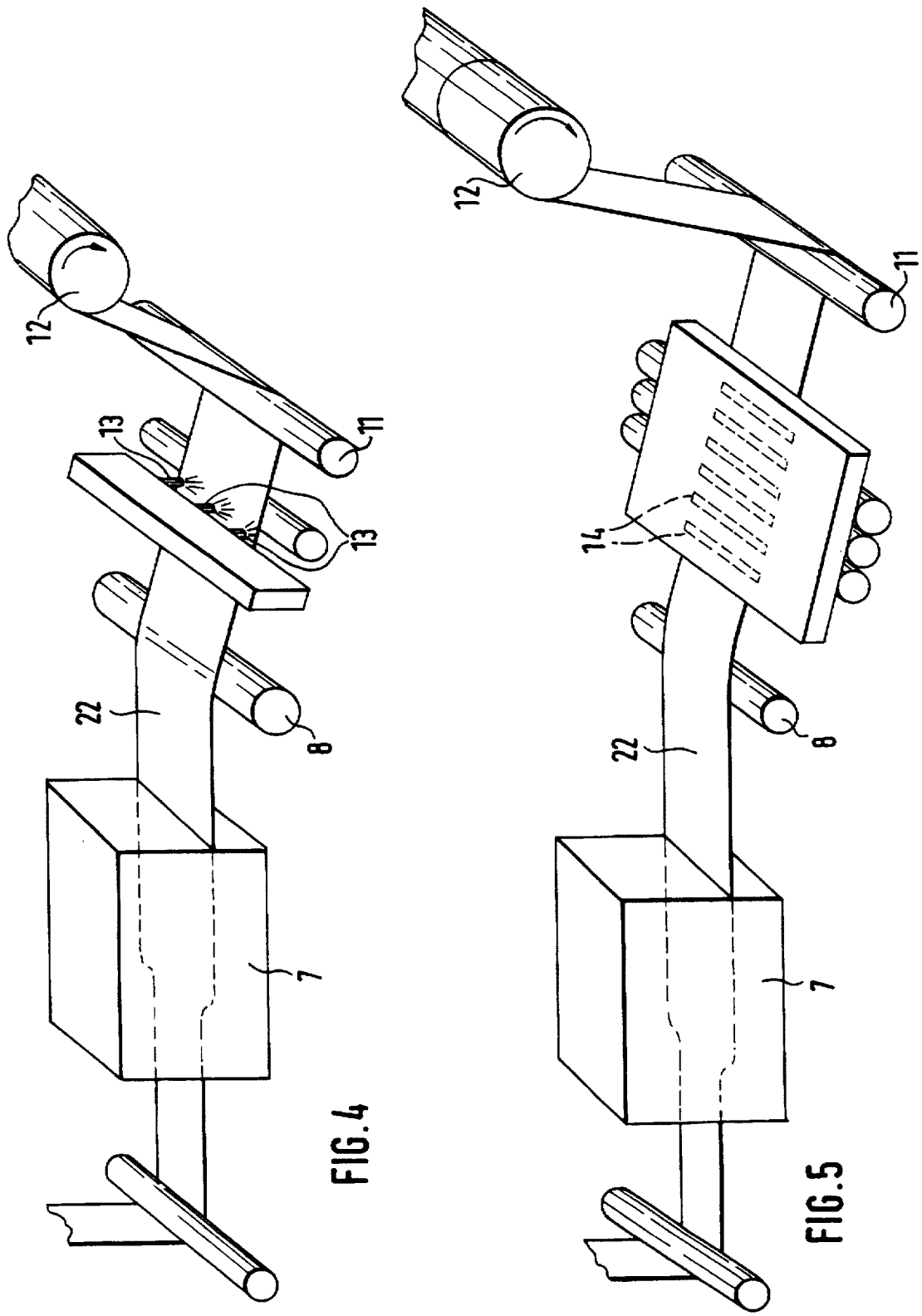

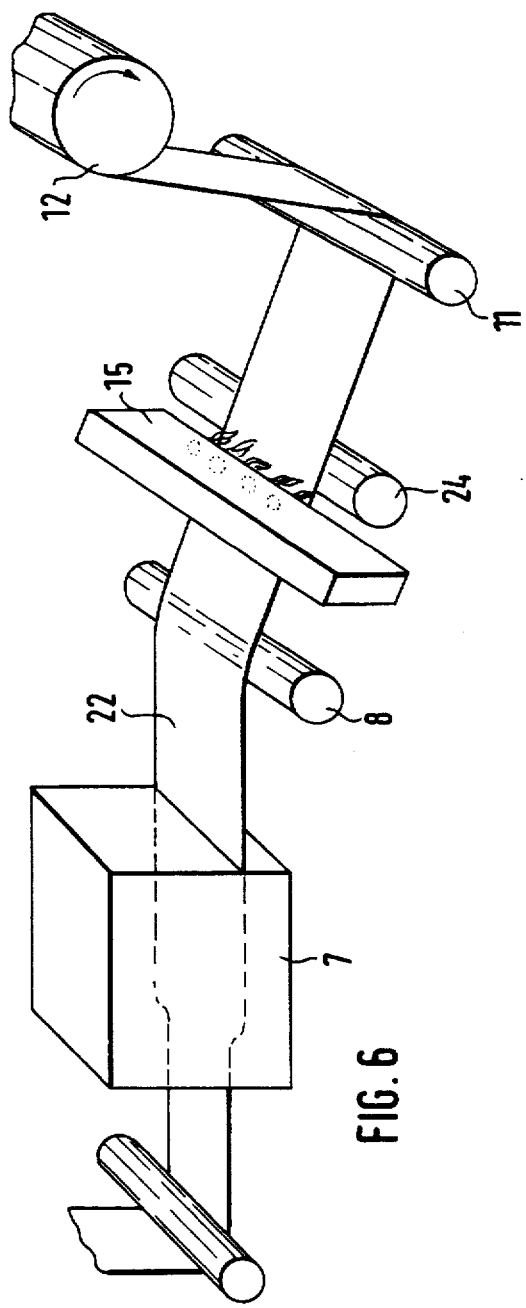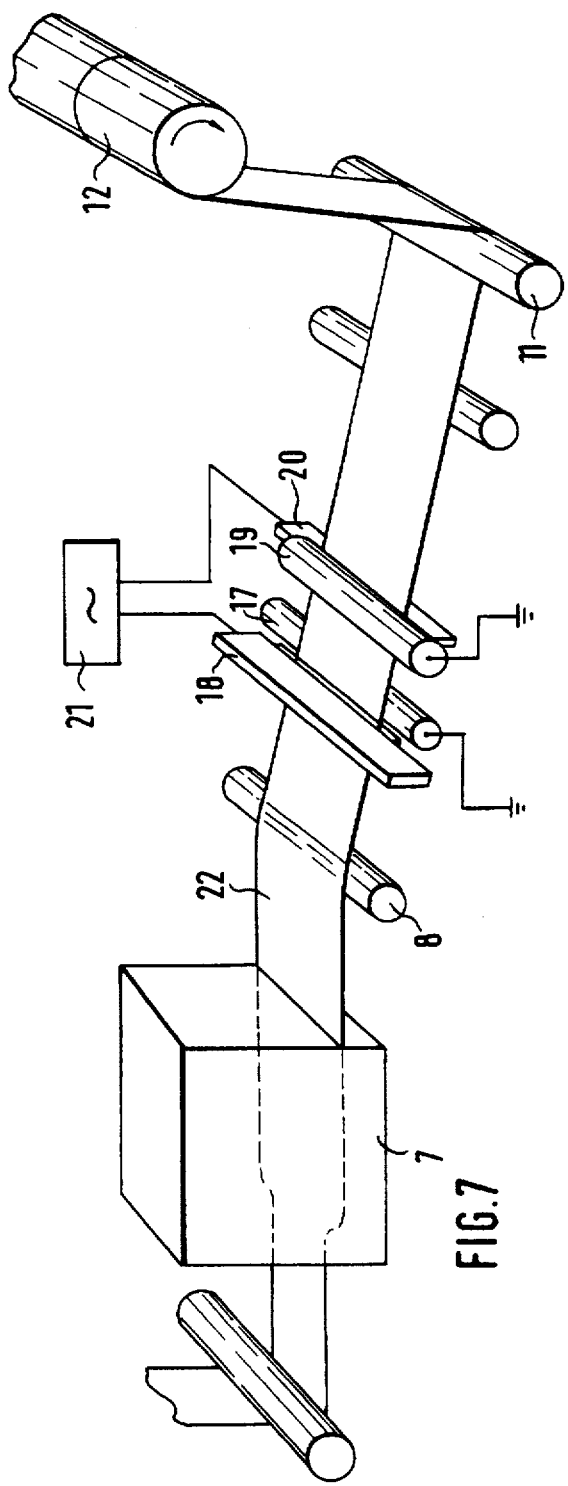

BIAXIALLY ORIENTED POLYOLEFIN FILM, PROCESS FOR ITS PREPARATION AND ITS USE

FIELD OF THE INVENTION

The invention relates to a biaxially oriented polyolefin film which contains a propylene polymer or a polypropylene blend, and a process for its preparation and its use. An aspect of this invention relates to a packaging film which has excellent planarity.

DESCRIPTION OF THE PRIOR ART

Biaxially oriented polyolefin films, such as, for example, polypropylene films (boPP films), are preferably used in the packaging sector. For the majority of applications there, printing of the films is necessary. They are processed on vertically or horizontally operating shaping and filling machines and on automatic wrapping machines. The packaging is usually closed by sealing together the edges of the film. About 80% of the boPP films produced are currently processed in the packaging sector.

The remaining proportion of the bopp films is used for technical applications, for example as metallizing or laminating films. Here, the films are processed, as a rule, on high-speed rolls.

In recent years, the film processing machines have become increasingly fast and increasingly precise.

In the wrapping of cigarette packs in boPP films, the speeds with which the packs were wrapped were 200 to 300 packs per minute ten years ago. Today, on the other hand, the speeds are about 350 to 450 packs per minute.

In the lining or the lamination of boPP films, the processing speeds have almost doubled in the last 10 years.

The films are printed on very precisely operating and very fast machines. As a result of the introduction of new techniques, for example laser engraving, substantially finer subjects can now be produced than was the case in the past, for example by means of the letterpress technique using rubber rolls.

The film properties must be adapted to the higher processing speeds and the high precision with which the wrapping or lining machines now operate. At the low processing speeds about ten years ago, for example, it was sufficient for the film to have a coefficient of sliding friction of about 0.4 to permit processing of this film on the machine. At today's speeds, the coefficient of friction of the film must be substantially below 0.3 in order for the film to run satisfactorily on the machine. The same applies to the thickness profile of the film, which now has to meet far higher requirements than was the case a few years ago. For the processing of the films on the high-speed automatic cigarette wrapping machines, it is now necessary for the relative thickness deviations of the films in the longitudinal direction and in the transverse direction to be substantially less than 3%.

In addition to the stated properties, outstanding planarity properties of the film are essential for satisfactory processing. The film must be virtually free from gage bands, it must have no sags and, in the case of so-called bowing, which comprises bow-shaped deformations, certain values must not be exceeded.

It is therefore an objective of this invention to provide a biaxially stretched polyolefin film which has excellent planarity properties, in particular a low bowing value. A further objective of this invention is to provide a process for the production of such a film and its use.

SUMMARY OF THE INVENTION

According to this invention, a polyolefin film is obtained wherein the bowing of the polyolefin film is less than 10 mm, based on a length L of 4.0 m of the polyolefin film. The polyolefin is a propylene polymer which contains at least 90% of propylene and has a melting point higher than 140° C. In an embodiment of the invention, the propylene polymer is selected from the group consisting of isotactic propylene homopolymers having an n-heptane-soluble fraction, copolymers of ethylene and propylene and copolymers of propylene with α-olefins. The polypropylene blend is in particular a blend of propylene homopolymers and/or copolymers and/or polyolefins having 2 to 6 carbon atoms, for example polyethylene, in particular HDPE, LDPE and LLDPE. Inorganic and/or organic fillers selected from the group consisting of alumina, aluminum sulfate, barium sulfate, calcium carbonate, magnesium carbonate, silicates, silica and/or titanium dioxide and polyesterpolystyrenes, polyamides and halogenated organic polymers are advantageously added to the propylene polymer or the polypropylene blend. The n-heptane-soluble fraction is usually less than 6% of the propylene homopolymer. The abovementioned films are singleply films, such as electrical insulation films, or base plies of multi-ply films.

In the event that the polyolefin film is a multi-ply film comprising a base ply and at least one top ply arranged thereon (e.g. a composite, transparent three-ply film of symmetrical structure), it is preferred that:

a) the base ply contains a polypropylene homopolymer and, if required, additives, b) the top ply or plies contain a copolymer of ethylene and propylene or ethylene and butylene or propylene and butylene or ethylene and an α-olefin having 5 to 10 carbon atoms or propylene and an α-olefin having 5 to 10 carbon atoms or a copolymer of ethylene, propylene and butylene (i.e. a terpolymer) or a copolymer (also a terpolymer) of ethylene, propylene and an α-olefin having 5 to 10 carbon atoms or a blend of two or more of the stated copolymers (including terpolymers), if required, additives, and c) the multi-ply polyolefin film has a bowing value of 5 to less than 10 mm.

The process for the production of such a biaxially oriented polyolefin film, which is extruded from a slot die in the form of a preliminary film, fed over at least one roll and cooled, successively longitudinally and transversely stretched, heat-set and cooled, comprises subjecting the biaxially oriented film, after the heat-setting and cooling and before winding, to a subsequent or further heat treatment such that its temperature is higher than after the cooling. For this purpose, the biaxially oriented polyolefin film is cooled to a temperature of less than or equal to 40° C. after the transverse stretching and after leaving the heat-setting zone, and the subsequent heat treatment is carried out in a temperature range of from greater than 40° C. to 80° C.

Immediately after the above-described subsequent heat treatment, the biaxially oriented polyolefin film is wound onto a winding roll and is cooled to a temperature of 10° to 30° C. over a period of 10 to 72 hours.

BRIEF DESCRIPTION OF THE DRAWINGS

The invention is illustrated in more detail below with reference to the drawings.

FIG. 4 is an isometric view similar to FIG. 3 showing an arrangement for heat treatment of a similar film wherein the heat-treating apparatus includes a nozzle arrangement and the treatment is effected by means of hot air.

FIG. 5 is an isometric view similar to FIGS. 3 and 4 showing an arrangement for heat treatment of a similar film wherein the heat treatment apparatus includes an IR lamp arrangment.

FIG. 6 is an isometric view similar to FIGS. 3 to 5 showing an arrangement for heat treatment of a similar film wherein the heat treatment apparatus includes a burner system.

FIG. 7 is an isometric view similar to FIGS. 3 to 6 showing a corona apparatus for the two-sided pretreatment of a biaxially oriented polyolefin film.

DETAILED DESCRIPTION

Although this invention is not bound by any theory, it is presently believed that the above-described subsequent heat treatment (i.e. the subsequent heat treatment of the heat-set, biaxially oriented film, after cooling but before winding) is a key factor which provides the resulting improvement in planarity of the film. Accordingly, another way of describing a film of this invention is that it is a biaxially oriented polyolefin film which contains a propylene polymer or a polypropylene blend, wherein the film has been heat treated after heat-setting and cooling, but before winding, to obtain a film wherein the bowing of the film is less than 10 mm, based on a length L of 4 m of the polyolefin.

The heat treatment of the biaxially oriented polyolefin film is effected by means of one or more heated rolls, against which the polyolefin film is placed with the aid of feed apparatuses, such as air squeegees or nip rolls, by blown, preheated air, by means of IR radiation, by a flame treatment in which the film is cooled and then passed over a heated roll and at the same time its surface facing away from the roll circumference is heated to the required temperature by a burner system, or on two sides by a corona discharge, the surface tension being greater than 37 mN/m and being up to 45 mN/m.

Polyolefin films produced in this manner are used as printed packaging films, in particular as packaging films for cigarette packs, as unprinted/printed laminating films, electrical insulation films and shrink films for all-round labelling of cylindrical packed material.

The invention has the advantage that a biaxially oriented polyolefin film is provided, in which the bowing—expressed by the magnitude of the bow—is substantially reduced compared with the prior art, with the result that the planarity properties of the film are considerably improved, so that the precise printability of the film and the processing speed on automatic packaging machines, when the film is used as wrapping film for packed material, such as, for example, cigarette packs, can be considerably increased.

Figure 1:
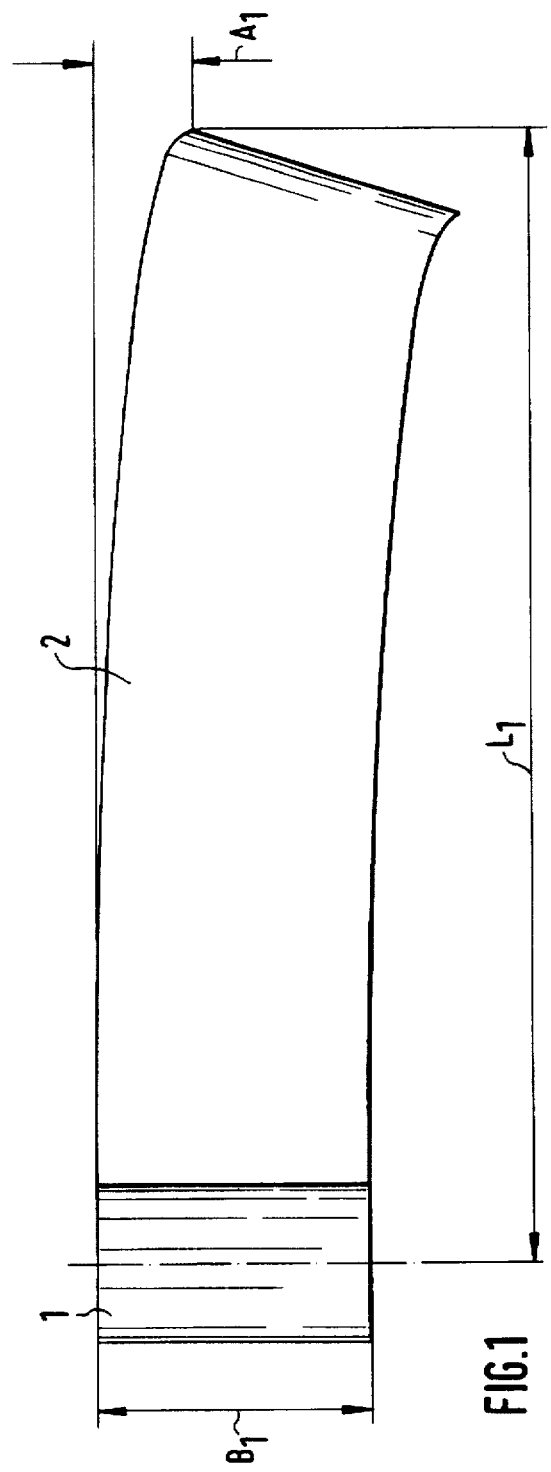
FIG. 1 is a schematic representation of the bowing of a film and a method for determining or measuring the amount of bowing.
Figure 2:
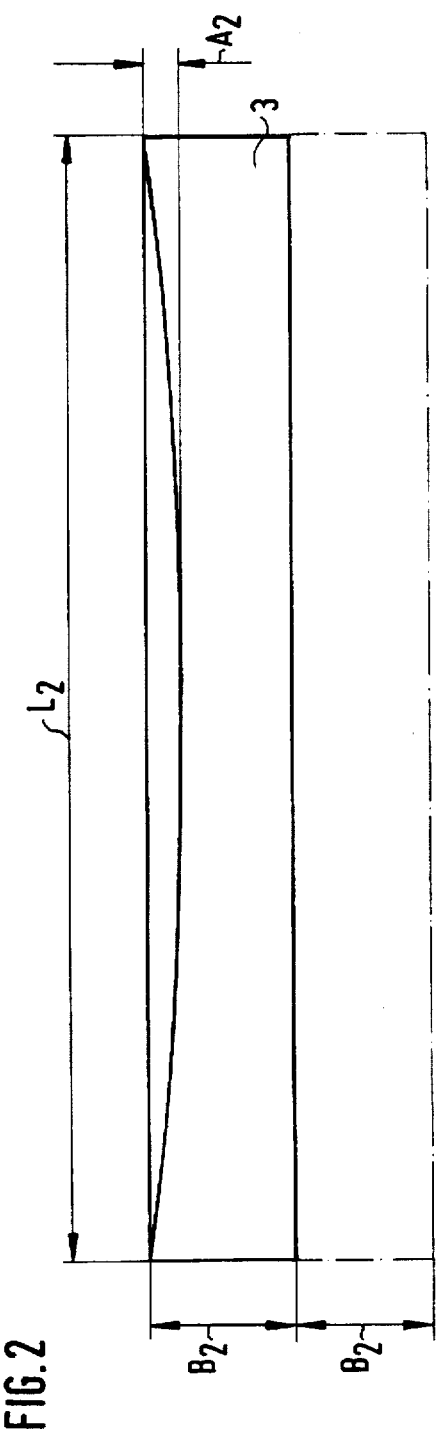
FIG. 2 is a schematic representation of the bowing of a film and a second method for determining the amount of bowing.

The bowing can be quantitatively determined, for example by the magnitude of the so-called bowing of the film. FIGS. 1 and 2 of the Drawing show two conventional methods for determining the bowing A.

In the method shown in FIG. 1, a film 2 is unwound over the length $L_1$ from a film roll 1 having the width $B_1$. The deviation $A_1$ from the imaginary straight line is measured. A measure of the bowing is the absolute magnitude $A_1$ or the relative magnitude $A_1/L_1$. In this method, the standard length $L_1$ is 4.0 m, while the width $B_1$ is less than or equal to 200 mm.

In the method shown in FIG. 2, a piece of film having a width $2B_2$ and a length $L_2$ is folded along the longitudinal central line to the width $B_2$ so that the corners come to rest against one another. The folded film 3 is pulled taut. If no bowing is present, all four edges coincide with one another. Otherwise, one longitudinal edge sags by the amount $A_2$. A measure of the bowing is once again the absolute magnitude $A_2$ or the relative magnitude $A_2/L_2$. The folded piece of film is indicated by continuous lines, and the unfolded piece of film in the lower half is indicated by dashed lines. In this method, the standard length $L_2$ is 4.0 m and the width $2B_2$ is greater than 200 mm.

The bowing causes a deviation in the printed image during printing or folds in the film during lamination with paper or board. During wrapping, for example of cigarette packs on automatic cigarette wrapping machines, the bowing results in displacement of the tear-off strip, which leads to rejection of the pack. Moreover, the resulting edges are not straight and may lead to seals which are not tight. As shown by investigations into the lamination of the boPP films, a bowing A of only 20 mm (measured by the second method) results in difficulties with regard to uniform application of adhesive and hence in fold formation, which cannot be accepted.

The bowing is a consequence of nonuniform orientation of the biaxially oriented film over the width. This nonuniform orientation is caused mainly in the transverse stretching in the so-called tenter oven.

In the biaxial orientation of polypropylene film by the tenter method, consecutive stretching is usually used. In this process, the thermoplastic material is first melted in an extruder, shaped into a preliminary film in a die and cooled on one or more rolls. The unstretched film is then longitudinally and transversely stretched in succession, the longitudinal stretching usually being effected before the transverse stretching. After the transverse stretching, the film is heat-set, cooled, if necessary pretreated for printing and finally wound up.

The bowing of the film can be made directly visible on the film during passage through the transverse stretching oven. A straight line which is drawn on the film over the width of the film entering the oven is deformed during the transverse stretching into a line which is curved over the film width, after leaving the oven.

The bowing is initiated by the different forces acting on the film and by the simultaneously occurring film shrinkage. Particularly at the end of the transverse stretching, when going over into the setting phase, where the mechanical properties of the film are at their lowest, the bowing may be pronounced owing to the forces acting on the film in the machine direction.

Using the methods disclosed to date for reducing the bowing, it has not yet been possible to meet the requirements described above. Thus, the attempts made include those aimed at reducing the bowing of the film by varying the stretching parameters and by changing the frame geometry (Journal of Applied Polymer Science, Vol. 48, pages 1399–1406, 1993, "An Attempt to Simulate the Bowing Phenomenon in Tenter", authors: T. Yamada and Ch. Nomomura).

The polyolefin films comprise essentially a propylene polymer or a polypropylene blend to which fillers have been added in an amount of 0.1 to 20% by weight.

The propylene polymer contains predominantly at least 90% of propylene and has a melting point of 140° C. or higher, preferably 150° to 170° C. Isotactic propylene homopolymer having an n-heptane-soluble fraction of 6% by weight or less, based on the isotactic propylene homopolymer, copolymers of ethylene and propylene having an ethylene content of 10% by weight or less, and copolymers of propylene with $C_4$-$C_8$-α-olefins having an α-olefin content of 10% by weight or less are preferred propylene polymers, isotactic propylene homopolymer being preferred. The stated percentages by weight are based on the particular copolymer. The propylene polymer generally has a melt flow index of 0.5 g/10 min to 8 g/10 min, in particular from 2 g/10 min to 5 g/10 min, at 230° C. and a force of 21.6 N (DIN 53 735). A mixture of the stated propylene homopolymers and/or propylene copolymers and/or other polyolefins, in particular having 2 to 6 carbon atoms, is also suitable, the mixture containing at least 50% by weight, in particular at least 75% by weight, of propylene polymer. Suitable other polyolefins in the polymer blend are polyethylenes, in particular HDPE, LDPE and LLDPE, the amount of these polyolefins not exceeding in each case 50% by weight, based on the polymer blend. The fillers are the conventional inorganic and/or organic materials. Inorganic fillers are alumina, aluminum sulfate, barium sulfate, calcium carbonate, magnesium carbonate, silicates, such as aluminum silicate (kaolin) and magnesium silicate (talc), silica and/or titanium dioxide, among which calcium carbonate, silica, titanium dioxide or mixtures thereof are preferably used.

Suitable organic fillers are the polymers usually used, in particular those such as polyesters, polystyrenes, polyamides and halogenated organic polymers, polyesters, such as, for example, polybutylene terephthalates, being preferred.

The amount of filler, in particular that of calcium carbonate $CaCO_3$, is 1 to 30% by weight, in particular 2 to 15% by weight, based on the total weight of the film. The mean particle size, in particular that of calcium carbonate, is in the range from 1 to 5 μm, in particular in the range from 1.5 to 3 μm.

The density of the film is in general in the range from 0.5 to 0.97 g/cm$^3$.

The polypropylene polymer can, if required, be partially degraded by the addition of organic peroxides. A measure of the degree of the degradation of the polymer is the so-called degradation factor A, which indicates the relative change in the melt flow index according to DIN 53 735 of the polypropylene, based on the starting polymer. In general, the degradation factor A of the polypropylene used is in the range from 3 to 15, preferably from 6 to 10.

Particularly suitable organic peroxides are the alkyl peroxides, an alkyl radical being understood as meaning the conventional saturated, straight-chain or branched lower alkyl radical having up to 6 carbon atoms. 2,5-Dimethyl-2,5-di-(tert-butylperoxy)-hexane and di-tert-butyl peroxide are particularly suitable.

The polyolefin film can, if required, contain a low molecular weight resin, the amount of which is 1 to 30% by weight, preferably 2 to 20% by weight. The softening point of the resin is between 80° and 160° C., preferably between 120° and 160° C. (measured according to DIN 1995-U4, corresponding to ASTME E-28). Among the low molecular weight resins, the hydrocarbon resins are preferred, in particular those in the form of the mineral oil resins (petroleum resins), styrene resins, cyclopentadiene resins and terpene resins (these resins are described in Ullmann's Enzyklopadie der Technischen Chemie, 4th Edition, Volume 12, pages 525 to 555). Suitable mineral oil resins are disclosed, for example in EP-A-0 180 087 which is hereby incorporated by reference.

The biaxially oriented polyolefin film is usually a composite film which comprises a base ply and at least one top ply which is arranged on the base ply. In general, at least two top plies are provided which, in a symmetric structure, enclose the base ply in the manner of a sandwich. The top ply or plies arranged on the surface or surfaces of the base ply comprises or comprise essentially a copolymer of ethylene and propylene or ethylene and butylene or propylene and butylene or ethylene and an α-olefin having 5 to 10 carbon atoms or propylene and an α-olefin having 5 to 10 carbon atoms or a terpolymer of ethylene, propylene and butylene or ethylene, propylene and another α-olefin having 5 to 10 carbon atoms or a mixture of two or more of the stated copolymers and/or terpolymers, and, if required, incorporated additives. The propylene polymer of the top ply may be identical to that of the base ply if a nonsealable top ply is desired.

The propylene polymer or the polymer blend of the top ply or plies has a melt flow index (DIN 53 735, at 230° C. and 21.6 N load) of 4 g/10 min to 15 g/10 min, preferably of 5 g/10 min to 12 g/10 min, the melt flow index of the top ply or plies being higher than that of the propylene polymer of the base ply.

The number of top plies depends on the intended use of the film. In general, one top ply is applied to each of the two sides of the base ply, corresponding to a ply structure ABA, where the top plies A may be identical or different in their structure and their composition.

The thickness of the top ply or plies is in general in the range from 0.2 to 3 μm, and top plies on both sides may be of identical or different thicknesses. The total thickness of the polyolefin composite film may vary within wide limits and depends on the intended use. It is, for example, 3 to 120 μm, in particular 5 to 100 μm, the base ply accounting for about 90 to 95% of the total film thickness.

In order to improve certain properties of the polyolefin film, both the base ply and the top ply or plies can contain further additives, preferably antistatic agents and/or antiblocking agents and/or lubricants and/or stabilizers and/or neutralizing agents, which are compatible with the polymers of the base ply and of the top ply or plies. In this context, reference is made expressly to the further additives described in DE-A-41 41 989, which are also used in the polyolefin film present here.

The polyolefin film is produced in a known manner by extrusion or coextrusion. For this purpose, the polymer present in granular form or the polymer blend of the individual plies is compressed and liquefied in an extruder, and the additives may be introduced or may be already contained in the starting materials. The melts are then pressed simultaneously through a slot die, and the extruded preliminary composite film is drawn off on one or more draw-off rolls, and cools and solidifies. The film is then stretched longitudinally and transversely to the extrusion direction, which leads to orientation of the molecular chains. The biaxially stretched film is heat-set and then wound up.

The biaxial stretching or orientation can be carried out simultaneously or the individual stretchings can be carried out in succession by first stretching longitudinally, i.e. in the machine direction, and then transversely, i.e. perpendicular to the machine direction. The longitudinal stretching is expediently carried out with the aid of two high-speed rolls which differ according to the desired stretching ratio, and the transverse stretching is carried out with the aid of a tenter frame, which engages the two longitudinal edges of the film.

After leaving the transverse stretching zone or the transverse stretching oven and after cooling below a temperature of about 40° C., but before being wound up, the polyolefin film is subjected to a heat treatment in such a way that the wound-up film is at an elevated temperature in the range from above 40° C. to about 80° C. on a winding roller. After this thermal treatment, the polyolefin film is slowly cooled on the winding roller, at the beginning of the cooling the winding roller being at about the same temperature as the film during the heat treatment. Cooling of the wound-up film is effected during storage over a period of 10 to 72 h, no stringently defined conditions having to be maintained in order to achieve the desired effect on the bowing. The further heating up of the film after the transverse stretching and the maintenance of the temperature over a certain period which is about, as already mentioned above, 10 to 72 h are evidently critical for the reduction of the bowing value.

The heat treatment of the film may in this case be carried out in various ways. Various embodiments of the arrangement for such a heat treatment are described briefly below with reference to FIGS. 3 to 7.

Figure 3:
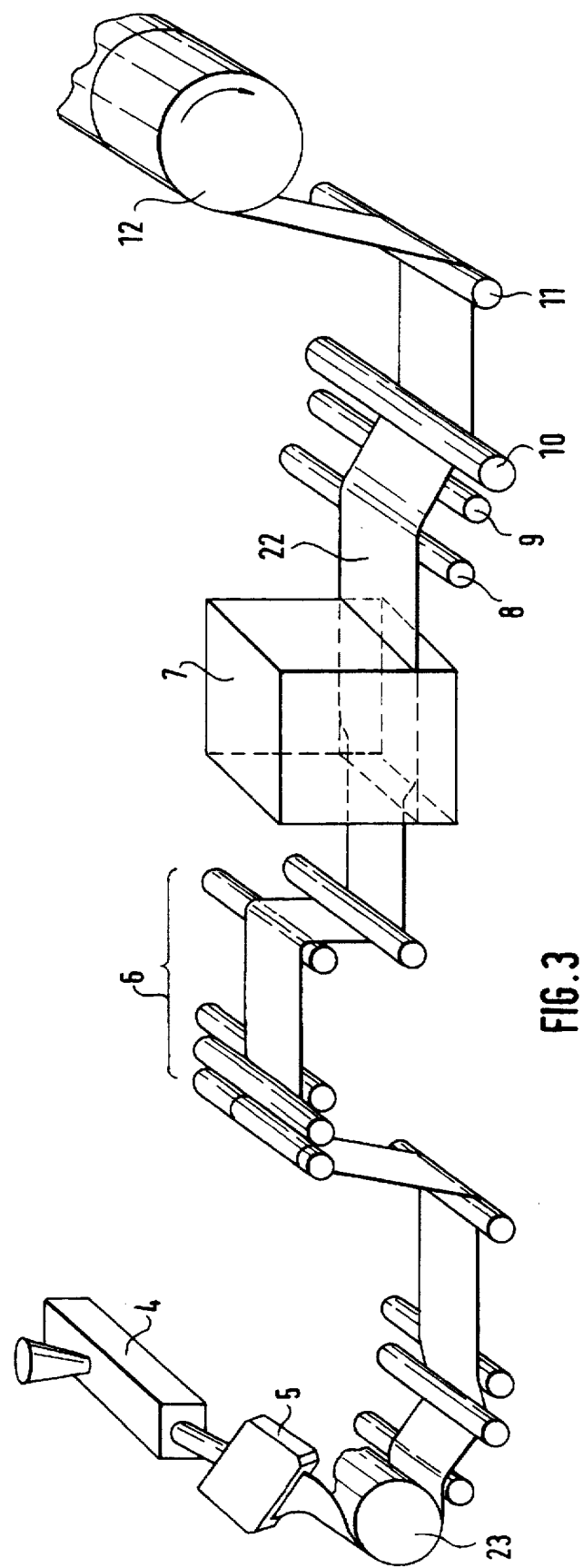
FIG. 3 is an isometric view of an arrangement (including components of a heat-treating apparatus) for the heat treatment of a biaxially oriented polyolefin film by means of heated roll(s).

FIG. 3 schematically shows a processing unit for a film 22, from the extrusion of the film to winding up. Granules of the starting materials of the film are introduced to an extruder 4. These granules are melted in the extruder and fed to a slot die 5, which produces, by extrusion or coextrusion, if the film is a composite film, a preliminary film, which is fed via a draw-off and cooling roll 23. In a longitudinal stretching zone 6, which comprises a number of rolls which rotate at different speeds, the film is oriented in the longitudinal direction, i.e. in the machine running direction. Thereafter, the film enters the transverse stretching and heat-setting station 7, in which it is stretched or oriented transversely to the machine running direction and at the same time the orientation of the molecular chains is stabilized by the heat-setting. The film 22 then passes through a cooling air shower and over one or more cooling rolls 8, on which it is cooled to a temperature of about 40° C. or lower. The film 22 is heated up in the downstream heating zone by means of a heating roll 10, against which the film is placed by means of a suitable feeder apparatus, for example a nip roll 9. The controlled positioning of the film 22 on the heating roll 10 is required because of the high machine speed. The suitable feeder apparatus is, for example, also an air squeegee, which however is not shown in FIG. 3. Instead of a single heating roll 10, one can optionally provide two or more heating rolls 10, depending on requirements. In the heating zone, the film 22 is heated to about 40° to 80° C. After leaving the heating zone, the film 22 is passed around a guide roll 11 and reaches a driven winding roll 12.

The processing units according to FIGS. 4 to 7 have substantially the same structure as the processing unit according to FIG. 3, and differ from this in each case only in the heat treatment station after completion of transverse stretching, heat-setting and cooling of the film.

In the processing unit according to FIG. 4, the film 22 is heated up by means of preheated air, which is blown onto the film by means of suitable nozzles. Suitable nozzles are, for example, so-called air squeegees. After leaving the transverse stretching and heat-setting station 7, the film 22 is passed over the cooling roll 8 and then enters the heat treatment station, in which it passes over a roll above which air nozzles 13 are located. Here, the film 22 which has cooled to a temperature of less than 40° C. is once again heated to a temperature in the range between 40° and 80° C. After leaving the heat treatment station, the film 22 is guided by a guide roller 11 in the direction of the winding roll 12.

The heat treatment of the film 22 is carried out in the processing unit according to FIG. 5 with the aid of IR lamps 14, which are arranged transversely to the film web and above it. After emerging from the transverse stretching and heat-setting station 7, the film 22 passes over the cooling roll 8 and enters the heat treatment station, in which it is passed over rolls above which the IR lamps 14 are arranged. After leaving the heat treatment station, the film 22 passes around the guide roll 11, in the direction of winding roll 12. FIG. 6 schematically shows the heating of the film 22 by means of flame heating. Here, after emerging from the transverse stretching and heat-setting station 7, the film 22 passes over the cooling roll 8 and enters the heat treatment station, which comprises a roll 24 and a burner system 15 for the flame treatment, which system is located above said roll. The flame treatment is a known method as described, for example, in U.S. Pat. No. 4,622,237. The roll 24 can be heated or slightly cooled. The burner system 15 brings the film 22 to the desired temperature in the range from 40° to 80° C.

FIG. 7 shows a heat treatment station which comprises two corona apparatuses. The heat treatment of the film 22 is carried out by heating by means of the corona apparatus or apparatuses. The corona heat treatment can operate satisfactorily in general only in the case of very thin films and two-sided corona treatment. After emerging from the transverse stretching and heat-setting station 7, the film 22 is passed over the cooling roll 8 and reaches a back-up roll 17 of the corona apparatus. The back-up roll 17 is at ground potential. Above the back-up roll 17 are located the high voltage electrodes 18, for example strip electrodes as shown in FIG. 7, which are parallel to one another and a small distance apart. Instead of strip electrodes, the high voltage electrodes 18 may also comprise wire electrodes. The high voltage electrodes 18 ionize the air between them and the upper surface of the film 22. The high voltage electrodes 18 are connected to a high voltage source 21 which applies an alternating voltage of about 10,000 volt, at a frequency of 10 kHz, to the high voltage electrodes. As a result of the corona discharge or spray discharge, the air between the electrodes and the film surface is ionized and reacts with the molecules of the film surface, so that polar occlusions form in the essentially nonpolar polymer matrix, and moreover the film 22 is heated to a temperature of between 40° and 80° C. The corona heat treatment is carried out in such a way that the surface tension of the film is greater than 37 mN/m and up to about 45 mN/m.

In the second corona apparatus, the back-up roll 19 is arranged above the film 22, while the high voltage electrodes 20 are present below the film 22. The back-up roll 19 is at ground potential whereas the high voltage electrodes 20 are connected to the high voltage source 21.

After leaving the corona apparatuses of this heat treatment station, the film 22 is passed around the guide roll 11 and wound onto the winding roll 12.

The heat treatment of the film 22 can also be effected by a combination of at least two of the heat treatment methods described above.

A film biaxially oriented in the processing unit according to FIGS. 3 to 7 and heat-treated is distinguished by a very low bowing value. According to the invention, the bowing A is less than 10 mm, measured by the method described with reference to FIG. 2.

The films may be sealable or nonsealable. They furthermore contain the conventional additives which they require for use as packaging films. In addition, the films are as a rule pretreated, at least on one side, for printing, the flame treatment or the electrical corona treatment or the combination of the two treatments preferably being used.

The invention is illustrated in detail below with reference to a non-limiting Example.

EXAMPLE

A transparent three-ply film having a symmetrical structure and a total thickness of 20 μm was produced by coextrusion and with subsequent stepwise orientation in the longitudinal direction and in the transverse direction. The top plies each had a thickness of 0.5 μm.

A base ply
  99.8% by weight of isotactic polypropylene
  0.2% by weight of N,N-bisethoxyalkylamine and
B top plies
  98.9% by weight of a random ethylene/propylene copolymer having a $C_2$ content of 4.5% by weight
  0.3% by weight of $SiO_2$ as an antiblocking agent having a mean particle size of 3 μm,
  0.8% by weight of polydimethylsiloxane having a viscosity of 30,000 mm$^2$/s The production conditions in the individual process steps are:

| Extrusion: | Temperatures: | A ply | 290° C. |
|---|---|---|---|
|  |  | B plies: | 280° C. |
|  | Temperature of the cooling and draw-off roll 23 |  | 20° C. |
| Longitudinal stretching: | Temperature |  | 130° C. |
|  | Longitudinal stretching ratio |  | 5.0 |
| Transverse stretching: | Temperature |  | 160° C. |
|  | Transverse stretching ratio |  | 10.0 |
| Setting: | Temperature |  | 110° C. |
|  | Convergence |  | 20% |
| Cooling of the film 22 after the transverse stretching to: |  |  | 30° C. |

Heating of the film 22 to 60° C. by means of a heated chromium-plate roll 10 which has a diameter of 400 mm and for which the angle of wrap is 170° C.

Winding of the film 22 to give a roll having a width of 4.70 m, the length of the wound-up film being 10,000 m. The average temperature of the roll was about 60° C. The roll was stored at a temperature of about 30° C. and was cooled in the course of 24 hours.

In a further step, the film was cut to the customer's width, and the bowing A was measured. The bowing of the film 22 according to the invention was 5 mm by the method according to FIG. 2.

COMPARATIVE EXAMPLE

A film identical to that of the Example with regard to the thickness ratios, to the film structure and to the process conditions was produced. In contrast to the Example, the film was not subjected to a heat treatment after the transverse stretching and heat-setting.

The bowing of this film was 25 mm.
What is claimed is:

1. A biaxially oriented polyolefin film comprising a propylene polymer containing at least 90% by weight propylene or comprising a polypropylene blend containing said propylene polymer, said film having been heat-set and cooled after having been biaxially oriented; wherein said film has been subjected to a further heat treatment at a temperature greater than 40° C. and up to 80° C. after said heat-setting and cooling, and wherein the bowing value, A, of the polyolefin film is less than 10 millimeters, based on a length L of 4 meters of the polyolefin film.

2. The biaxially oriented polyolefin film as claimed in claim 1, said propylene polymer contains at least 90% by weight of propylene and has a melting point higher than 140° C.

3. The biaxially oriented polyolefin film as claimed in claim 1, said propylene polymer is selected from the group consisting of isotactic propylene homopolymers having an n-heptane soluble fraction of 6% by weight or less, copolymers of ethylene and propylene and copolymers of propylene with α-olefins.

4. The biaxially oriented polyolefin film as claimed in claim 1, said propylene blend is a blend selected from the group consisting of a propylene homopolymer blend, a propylene copolymer blend, a blend containing polyolefins wherein one polyolefin has a combination of said blends.

5. The biaxially oriented polyolefin film as claimed in claim 1, said film containing an additive selected from the group consisting of: alumina, aluminum sulfate, barium sulfate, calcium carbonate, magnesium carbonate, silicates, silica, titanium dioxide, polyester, polystyrene, polyamide, halogenated organic polymer and a combination thereof.

6. The biaxially oriented polyolefin film as claimed in claim 1, said polyolefin film being a composite film comprising a base ply and at least one top ply arranged thereon,
   a) the base ply containing a polypropylene homopolymer and, optionally, a baseply additive compatible with said polypropylene homopolymer,
   b) the top ply or plies containing a polymer selected from the group consisting of:
      (1) a copolymer of ethylene and propylene,
      (2) a copolymer of ethylene and butylene,
      (3) a copolymer of propylene and butylene,
      (4) a copolymer of ethylene and an α-olefin having 5 to 10 carbon atoms,
      (5) a copolymer of propylene and an α-olefin having 5 to 10 carbon atoms,
      (6) a terpolymer of ethylene, propylene and butylene,
      (7) a terpolymer of ethylene, propylene and an α-olefin having 5 to 10 carbon atoms and
      (8) a blend thereof
   said top ply or plies optionally containing a top-ply additive compatible with said polymer,
   c) the composite polyolefin film having a bowing value, A, ranging from 5 millimeters to less than 10 millimeters;
   said base-ply additive and said top-ply additive being selected from the group consisting of an antistatic agent, an antiblocking agent, a lubricant, a stabilizer, a neutralizer and a combination thereof.

7. The biaxially oriented polyolefin in film as claimed in claim 6, wherein the composite film is a transparent three-ply film comprising a base ply and two top plies which sandwich the base ply in a symmetrical structure.

8. The biaxially oriented polyolefin film as claimed in claim 7, wherein the base ply comprises 99.8% by weight of an isotactic polypropylene and 0.2% by weight of N,N-bisethoxyalkylamine;
   and wherein each of the top plies contains 98.9% by weight of a random ethylene/propylene, 0.3% by weight of an $SiO_2$ antiblocking agent having a mean particle size of 3 µm, and 0.8% by weight of a polydimethylsiloxane lubricant having a viscosity of 30,000 $mm^2/s$.

9. A package comprising essentially cylindrical objects or a cigarette pack, enclosed within a packaging film or shrink film, said packaging film or shrink film being a biaxially oriented polyolefin film as claimed in claim 1.

10. An electrical component insulated with an electrical insulation film, said electrical insulation film being a biaxially oriented film as claimed in claim 1.

11. A heat treated, biaxially oriented polyolefin film containing a propylene polymer or a polypropylene blend wherein said biaxially oriented polyolefin film has been heat set and cooled prior to said polyolefin film being further heated at a temperature greater than 40° C. and up to 80° C. until the bowing value, A, of the heat treated polyolefin film is less than 10 millimeters, based on a length L of 4 meters of the thus-treated film.

* * * * *